S. E. Chase.
Horse Shoe Nail Making.
№ 78,644.   Patented Jun. 9, 1868.

Witnesses
J. B. Crosby
Francis Gould

Inventor
S. E. Chase

UNITED STATES PATENT OFFICE.

S. E. CHASE, OF BOSTON, MASSACHUSETTS.

IMPROVEMENT IN MAKING HORSESHOE-NAILS.

Specification forming part of Letters Patent No. 78,644, dated June 9, 1868.

*To all whom it may concern:*

Be it known that I, S. E. CHASE, of Boston, in the county of Suffolk and State of Massachusetts, have invented an Improvement in Finishing Nails; and I do hereby declare that the following, taken in connection with the drawings which accompany and form part of this specification, is a description of my invention sufficient to enable those skilled in the art to practice it.

This invention relates to a process or method of operation in finishing nails by giving to them a desirable curvature throughout the body, and a beveled and pointed form at one end.

The nails which I propose to finish are those which are used for securing shoes to the hoofs of animals, which nails are taken by me when made by hand or otherwise, and are by my process finished, as regards curvature and pointing, by mechanism, instead of by hand.

It is well known to shoers of animals that they have to manipulate each of the nails which they use for shoeing to give to them a proper curvature and point, to make it certain that each nail driven by them into a hoof shall come out of the hoof on the outside at a proper height from the sole, so as to prevent injury to the animal by the nail entering the sensitive part of the hoof. This manipulation is now generally performed by the hand-hammer, which in giving the bevel which forms the point spreads the material of the nail at the point, which is objectionable.

My invention consists in the following process:

First. The nails in a nearly-finished condition as to form, whether brought to such condition by hand-forging or by the operation of mechanism, are submitted, on an anvil or bed of proper form, to the action of a die of proper form, which will give the nail the proper longitudinal curvature in one direction or flatwise of the nail and the bevel at the point end, the superfluous metal at the end of the nail being spread out on each side of the point.

Second. The nail properly curved and with the point beveled, but spread on each side, is submitted to the action of a die, which forces the nail through a hole in a bed, the outline of the die and of the hole in the bed corresponding and acting as shears to shear or cut the nail at its point to the exact form desired in a finished nail by removing from the sides thereof the surplus metal which has been spread by the action of the beveling-die. In this second operation the nail is not only trimmed sidewise, but by being forced through the open die-hole under the salient die is straightened sidewise.

I am aware that it is not new to finish the points of nails by filing; also, that it is not new to finish nails by inclosing them in a matrix in which the point is brought to a bevel by the operation on the nail in the matrix of a rolling-die, which operates not to spread the metal at the point, but to condense it, as shown in the United States Patent No. 62,682, so that it will be understood that I make no claim to said processes of finishing nails.

In the process last referred to, as set forth in the United States Patent No. 62,682, the great objection is that the die and matrix soon give out under the severe strain requisite to condense the metal in the matrix to form the beveled point, while in my process the nail being uninclosed when the die bevels the point, the metal spreads, and then the surplus is removed at a subsequent separate operation at another location.

The drawings only represent the parts immediately concerned in the operation of pressing the nail to curve its body and to bevel its point and the parts employed in shearing the end of the nail at and in the vicinity of the point. The press by which said parts are worked may be any known form which will give the requisite movements with sufficient power, and forms no part of my present invention. The nails may be presented to the curving and beveling die and the shearing-die and its co-operative open matrix by hand or by an automatic feed; but as an automatic feed is not the subject of the invention for which I now seek a patent, nothing further will herein be said concerning my invention of one.

In the drawings, Figure 1 shows an underneath or reversed plan of the piece *a*, carrying the curving and point-beveling die *b* and the shearing-die *c*.

Figure 1:
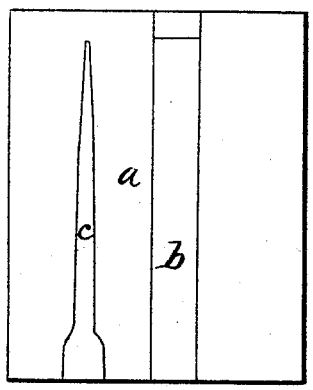
Figure 2:
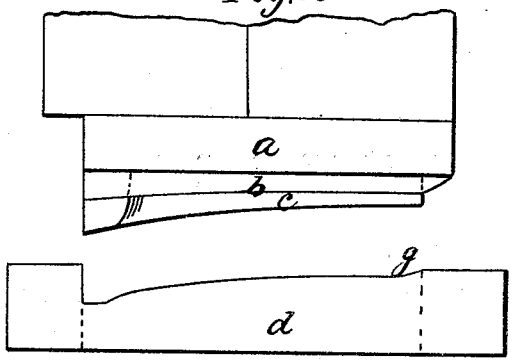
Fig. 2 shows in elevation the piece *a* and the dies *b* and *c*, and the bed or anvil *d*, on which the nail *e* is curved and beveled, and in which bed is made the open die seen in Fig. 3, at *f*, said figure being a top plan of the bed or anvil *d*.
Figure 3:
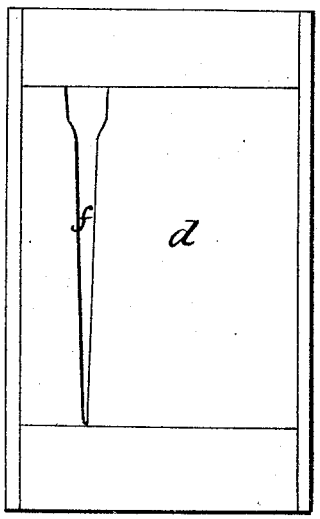
Figure 4:
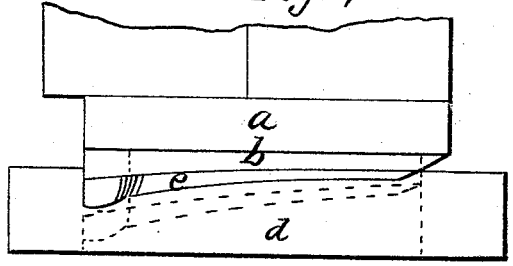
Fig. 4 shows in elevation the same parts that are shown in Fig. 2, but they are in the position in which the pressing-die $b$ is acting on a nail on the surface of bed $d$, and the die $c$ is acting to force a nail through the opening $f$.
Figure 5:
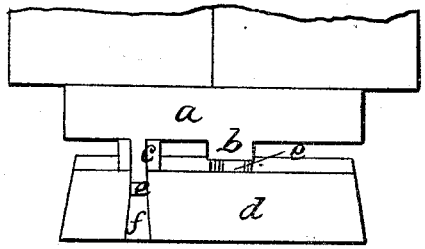
Fig. 5 is a sectional view showing the parts in the position which they have in Fig. 4.

The flat side of the nail is the side presented to the action of the dies $b$ and $c$, the bed $d$ being made of the form of that surface of the nail having the projection of the head, the short bevel which forms the point of the nail being made in said bed at $g$. If a nail in a nearly finished form is laid upon the bed beneath the die $b$, said die in descending will press the nail between its lower surface and the upper surface of the bed, giving the nail the general curvature shown in Fig. 4, and making a beveled end by widening the end. The nail in this condition being placed over the opening $f$, with the shape of which it nearly conforms, except at the end spread by beveling, the die $c$ at its descent will force the nail through the opening $f$, shearing off any superfluous width and leaving the nail in a condition in which it is ready for use, though a little rattling in a tumbler-barrel will quickly remove the disagreeable sharpness and fins from the corners of the nails.

I claim—

In finishing nails, the process of curving their bodies and beveling their points, and afterward forcing them through an open die to shear off superfluous metal, substantially as and for the purpose specified.

S. E. CHASE.

Witnesses:
J. B. CROSBY,
FRANCIS GOULD.